Oct. 19, 1926.
P. E. HAWKINSON
1,603,338
VEHICLE WHEEL
Original Filed Oct. 29, 1919   2 Sheets-Sheet 2
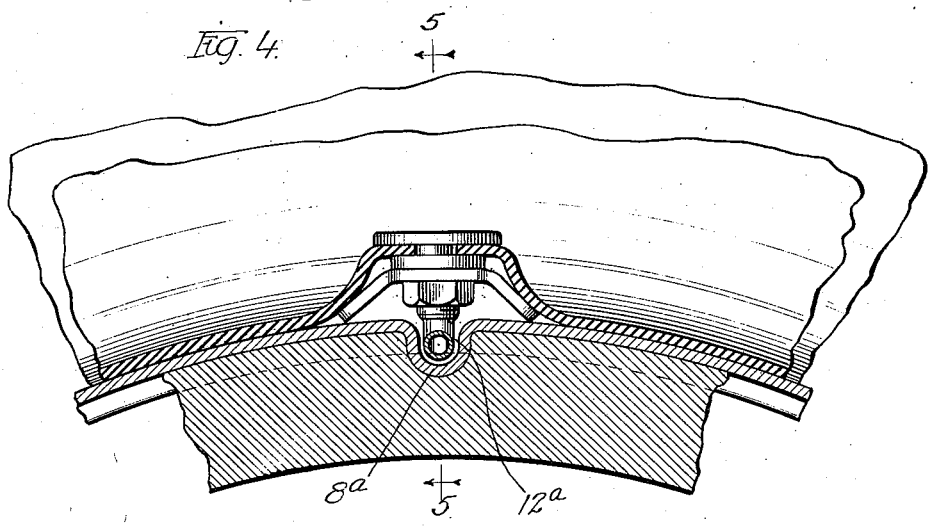
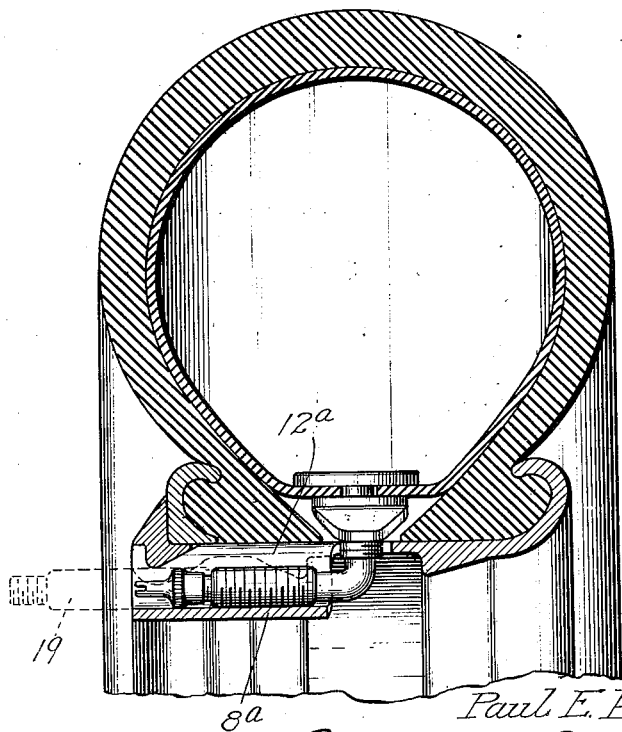

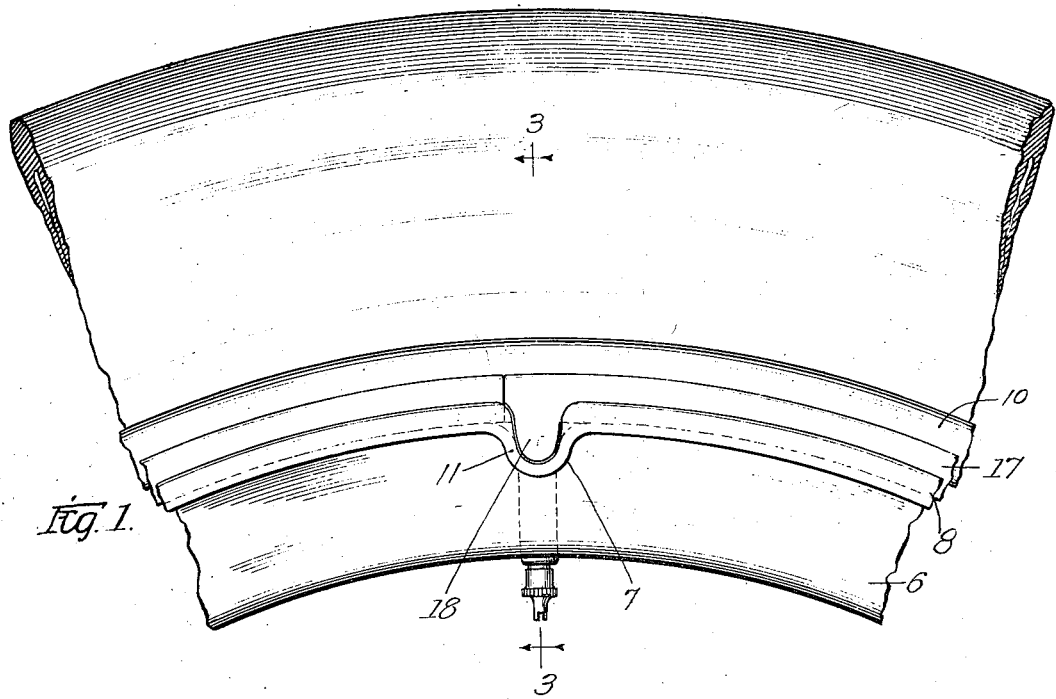
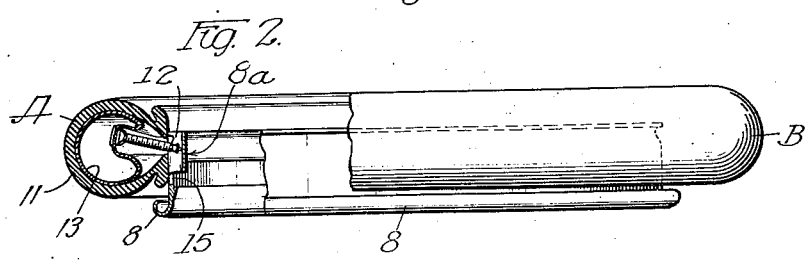
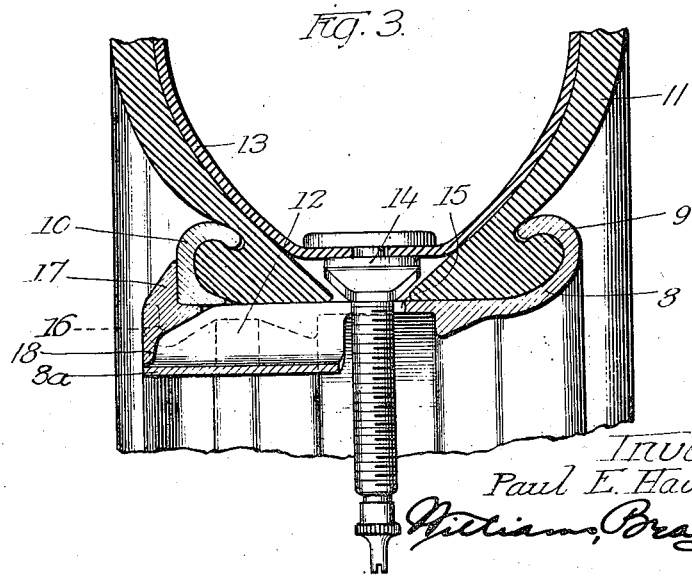

Patented Oct. 19, 1926.

1,603,338

UNITED STATES PATENT OFFICE.

PAUL E. HAWKINSON, OF MINNEAPOLIS, MINNESOTA, ASSIGNOR, BY MESNE ASSIGNMENTS, TO THE GOODYEAR TIRE & RUBBER COMPANY, OF AKRON, OHIO, A CORPORATION OF OHIO.

VEHICLE WHEEL.

Application filed October 29, 1919, Serial No. 334,275. Renewed February 1, 1923.

My invention relates to vehicle wheels of the type used with pneumatic tires and has for its general object the provision of means for facilitating quick and easy mounting of a tire on the wheel, and removal of the tire therefrom.

In the preferred form of the invention the improvement is applied to a rim, and by its use the heretofore long and laborious process of putting a tire on the rim or removing it therefrom is greatly shortened and simplified.

As is commonly known, the tire rim heretofore used is provided with an opening arranged for the reception of a valve stem extending inwardly from the pneumatic tire. In applying a tire to the old form of rim it has been the practice to insert the valve stem in the opening and then to force the tire over and around the rim. The insertion of the valve stem into the opening necessarily places that portion of the tire immediately adjacent the valve stem in proper position on the rim, and that portion of the tire opposite the valve stem to one side of and not on the rim. This results in the tire assuming an oblique position with respect to the rim, and if the tire fits the rim snugly, as it should, the workman has considerable difficulty in forcing the tire onto the rim.

By my invention the tire may be put on the rim or removed therefrom without causing the tire to assume an oblique position with respect to the rim, thereby permitting easy and quick removal and replacement of the tire.

These and other objects will be pointed out more clearly in connection with the accompanying drawings, wherein—

Figure 1 is a fragmentary side elevational view of a vehicle wheel, rim and tire, embodying the improvements of my invention;

Figure 2 is a top elevational view of a tire and rim, some of the parts being shown in section, showing the tire partly in position on the rim;

Figure 3 is a fragmentary cross sectional view taken along the line 3—3 of Figure 1, looking in the direction indicated by the arrows;

Figure 4 is a fragmentary cross sectional view showing a modified arrangement; and Figure 5 is a cross sectional view taken along the line 5—5 of Figure 4, looking in the direction indicated by the arrows.

Referring first to Figure 1, 6 designates a vehicle wheel felly provided with a groove 7 extending transversely across the periphery of the felly. In the preferred form of the invention this groove 7 extends from the outer lateral edge of the felly 6 to a point substantially at the center of the felly. Fitting around the periphery of the felly 6 is a tire rim 8 which may be of the clincher or straight side type, for holding either a clincher tire or a straight side tire. In the drawings I have shown my invention as applied to a clincher type of quick detachable rim.

The particular rim shown in the drawings comprises a side ring 9 formed integrally with the rim 8 and a removable side ring 10, both side rings co-operating with the tire casing shown at 11, for the purpose of holding the tire to the rim. The rim 8 is provided with a downwardly extending offset portion $8^a$, forming a valve stem groove or passageway 12. This passageway, as most clearly illustrated in Figure 3, extends from one of the lateral edges of the rim, preferably the outer edge, to a point substantially at the center of the rim. The offset portion $8^a$ of the rim is arranged to fit in the groove 7 provided in the felly 6, this arrangement serving as a means for locking the rim to the felly.

The inner tube of the tire is shown at 13 and carries the usual form of valve stem 14 extending inwardly from the tire and passing through the usual opening 15 provided in the rim 8. The valve stem 14 also passes through a registering opening provided in the felly 6, and extends to a point within the vehicle wheel and between the spokes, where it is accessible for inflating the tire.

The outer lateral edge of the rim 8 is provided with the usual groove 16, arranged for the reception of a split locking ring 17 for locking the side ring 10 in place, as shown in Figure 3. One end of the locking ring 17, as most clearly shown in Figures 1 and 3, is enlarged at 18, the enlarged portion having substantially the cross section and shape of the groove 12 formed by the offset portion $8^a$ of the rim. The enlarged portion 18 of the split ring extends into the valve stem passageway or groove 12 and serves the dual function of sealing the groove 12 and of holding the locking ring in place.

In removing the tire, including the inner tube 13 and casing 11, from the rim 8, the split locking ring 17 is first released from the groove 16 and then the side ring 10 is removed. The valve stem 14 is then pressed outwardly into the tire casing 11, until the free end of the valve stem lies flush with or slightly beyond the innermost portion of the groove 12 formed by the offset portion 8a. The valve stem is then forced into the groove 12 and released, the outer or free end of the valve stem bearing against the innermost part of the offset portion 8a. The tire is then removed from the rim, as shown in Figure 2, every portion of the tire being moved a like amount, until the whole tire may be removed from the rim.

In putting the tire onto the rim the valve stem is first pressed into the tire casing 11, and the free end of the stem pushed into the groove 12. The tire is then pressed evenly onto the rim, every portion of the tire being pressed onto the rim a similar amount, until the whole tire is in place. The valve stem then is caused to assume the position illustrated in Figure 3. The tire may be removed from or placed on the rim in this manner without necessitating removal of the rim from the wheel.

In Figures 4 and 5 I have shown a modified arrangement in which the valve stem is bent or curved and extends laterally through the groove 12a formed by the offset portion 8a of the tire rim. The valve stem in this case is made comparatively short, so that it does not extend beyond the lateral outer edge of the tire rim. In this form an extension piece 19, shown in dotted lines in Figure 5, is generally found desirable for use in inflating the tire. In the modification here shown the tire rim is identical with that shown in Figures 1 to 3 inclusive. In putting a tire having a valve stem as shown in Figures 4 and 5, onto the rim, and removing it therefrom, the same procedure as is described in connection with Figures 1 to 3 inclusive is carried out, except that the curved valve stem need not be pressed inwardly, as is necessary in the arrangement of Figure 3.

In placing a tire on the old form of rim, the valve stem 14 is first placed through an opening corresponding with 15, with the result that the portion of the tire shown at A in Figure 2 is practically in place on the rim and the portion shown at B is not in position on the rim, but is disposed to one side thereof, therefore causing the tire to assume an oblique position with respect to the rim. If the tire is of the correct size so that it fits the rim rather snugly, it becomes very difficult to force the portion B of the tire over and around the rim. It will be observed from the description hereinbefore given that by my improvement the difficulty encountered by positioning the tire obliquely and then forcing it onto the rim, is entirely overcome by providing the valve stem groove or passageway, which permits the tire to be forced onto the rim evenly and all portions thereof at the same time.

Having thus described my invention, what I claim as new and desire to secure by Letters Patent of the United States is:—

1. A pneumatic tire rim having a valve stem opening and provided with an offset portion extending transversely from one of its lateral edges to said opening, said offset portion forming a groove for the reception of a valve stem, a side ring for the rim and a split locking ring for the side ring, said locking ring having one of its ends enlarged and arranged to fit in the groove formed by said offset portion for the purpose of sealing said groove.

2. In combination, a vehicle wheel having a transverse groove provided in its periphery, a rim for said wheel, said rim having an offset portion extending transversely from one of its lateral edges to substantially the center thereof and forming a valve stem groove, the offset portion of the rim being arranged to fit in the groove provided in said wheel, a side ring for the rim and a split locking ring for the side ring, said locking ring having one of its ends enlarged and arranged to fit in the groove formed by said offset portion.

3. In combination, a vehicle wheel having a transverse groove provided in its periphery, a rim for said wheel, said rim having a valve stem opening and provided with an offset portion extending transversely from one of its lateral edges to the opening and forming a valve stem groove, the offset portion of the rim being arranged to fit in the groove provided in said wheel, a side ring for the rim, and a split locking ring for the side ring, said locking ring having one of its ends enlarged and arranged to fit in the groove formed by said offset portion.

In witness whereof, I hereunto subscribe my name this 6th day of October, 1919.

PAUL E. HAWKINSON.